(12) United States Patent
Palazzolo et al.

(10) Patent No.: US 6,582,011 B2
(45) Date of Patent: Jun. 24, 2003

(54) VEHICLE CROSS CAR BEAM

(75) Inventors: Jack S. Palazzolo, Dearborn, MI (US); David J. Cauvin, Royal Oak, MI (US); Joseph J. Davis, Jr., Ortonville, MI (US); Jeffrey L. Soncrant, Sterling Heights, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/961,717

(22) Filed: Sep. 24, 2001

(65) Prior Publication Data

US 2002/0038965 A1 Apr. 4, 2002

Related U.S. Application Data

(63) Continuation-in-part of application No. 09/265,745, filed on Mar. 9, 1999, which is a continuation-in-part of application No. 09/608,569, filed on Jun. 30, 2000.

(51) Int. Cl.[7] .......................... B60K 37/00; B62D 25/14
(52) U.S. Cl. ...................... 296/208; 296/70; 454/69; 165/171; 138/117
(58) Field of Search ................ 296/70, 72, 208; 454/69, 127, 143, 107; 280/779; 165/171; 138/117

(56) References Cited

U.S. PATENT DOCUMENTS

| | | |
|---|---|---|
| 3,817,552 A | 6/1974 | Knight, IV et al. |
| 4,391,465 A | 7/1983 | Piano |
| 4,733,739 A | 3/1988 | Lorenz et al. |
| 5,085,465 A | 2/1992 | Hieahim |
| 5,088,571 A | 2/1992 | Burry et al. |
| 5,180,189 A | 1/1993 | Moreno |
| 5,273,310 A | 12/1993 | Terai |
| 5,311,960 A | 5/1994 | Kukainis et al. |
| 5,312,133 A | 5/1994 | Pietila et al. |
| 5,354,114 A | 10/1994 | Kelman et al. |
| 5,358,300 A | 10/1994 | Gray |
| 5,364,159 A | 11/1994 | Kelman et al. |
| 5,556,153 A | 9/1996 | Kelman et al. |
| 5,673,964 A | 10/1997 | Roan et al. |
| 5,676,216 A | 10/1997 | Palma et al. |
| 5,678,877 A | 10/1997 | Nishijima et al. |
| 5,707,100 A | 1/1998 | Suyama et al. |
| 5,762,395 A | 6/1998 | Merrifield et al. |
| 5,823,602 A | 10/1998 | Kelman et al. |
| 5,934,744 A | 8/1999 | Jergens et al. |
| 5,997,078 A | 12/1999 | Beck et al. |
| 6,073,987 A | 6/2000 | Lindberg et al. |
| 6,159,200 A | 12/2000 | Verdura et al. |
| 6,186,885 B1 | 2/2001 | Ahn et al. |
| 6,234,569 B1 | 5/2001 | Derleth et al. |
| 6,237,956 B1 | 5/2001 | Haba et al. |
| 6,250,706 B1 * | 6/2001 | Davis, Jr. et al. ............ 296/70 |
| 6,273,495 B1 | 8/2001 | Haba et al. |

FOREIGN PATENT DOCUMENTS

| | | |
|---|---|---|
| JP | 406156315 | 6/1994 |
| JP | 0160316 | 7/1996 |

* cited by examiner

Primary Examiner—D. Glenn Dayoan
Assistant Examiner—Hilary Gutman
(74) Attorney, Agent, or Firm—MacMillan, Sobanski & Todd, LLC (57) ABSTRACT

A plastic cross car beam for a motor vehicle includes first and second members joined together at sealing points to form at least two ducts. The cross sectional shapes of the ducts are essentially constant along the length of the cross car beam and shaped to provide structural support for various types of loadings. Each duct is provided with at least one inlet, aligned with an HVAC assembly, and one outlet, aligned with a vent or register. Preferably a support member, which is integral with one of the members, extends downward from one of the ducts and supports an HVAC case. Also, preferably, the support member is provided with a pocket for receiving an energy absorbing bracket.

14 Claims, 11 Drawing Sheets

VEHICLE CROSS CAR BEAM

CROSS-REFERENCE TO RELATED APPLICATIONS

This application is a continuation-in-part of co-pending U.S. patent application Ser. Nos. 09/265,745, filed on Mar. 9, 1999, and 09/608,569, filed on Jun. 30, 2000.

BACKGROUND OF THE INVENTION

This invention relates in general to motor vehicles and in particular, to motor vehicle components. More particularly, the invention relates to cross car beams, ducts, and support brackets for motor vehicles.

A conventional motor vehicle has an engine compartment toward its forward end and a passenger compartment rearward of the engine compartment. A laterally extending partition, commonly referred to as a firewall, is disposed between the engine compartment and the passenger compartment. A plenum chamber extends laterally along an upper end of the firewall. A forward end of the plenum chamber is typically welded to the top of the firewall. Opposing lateral ends of the plenum chamber are attached to hinge pillars, often referred to as cowl sides, disposed along opposing sides of the motor vehicle toward a forward end of the passenger compartment.

The conventional motor vehicle also typically has a flange disposed toward a forward end of the plenum chamber. The flange is provided for supporting the windshield. A cross car beam extends between the cowl sides. Opposing lateral ends of the cross car beam are attached to the cowl sides. A conventional cross car beam is a closed steel chamber that increases the structural integrity of the vehicle, offering resistance to lateral impacts sustained along sides of the vehicle.

The conventional metal cross car beam is also strong enough to provide support for various components. Such components include a glove compartment, a radio, a tape deck or CD player, various storage pockets, an ashtray, a cigarette lighter or power outlet, and a coin receptacle. Also, typically, a steering column support bracket extends longitudinally between the plenum chamber and the cross car beam. A conventional steering column support bracket is typically 3 millimeters thick metal. A forward portion of the steering column support bracket is attached to the plenum chamber and a rearward portion of the steering column support bracket is attached to the cross car beam. The rearward portion further has mounted thereto a steering column.

Extending rearward of the cross car beam are laterally spaced energy absorbing (E/A) brackets which function to slow the occupants down and assist the seat belts when the motor vehicle sustains an impact.

Typically, disposed forwardly of the cross car beam is a duct. The duct functions to supply air to the passenger compartment. The duct usually has a supply inlet toward a forward end of the duct and a plurality of laterally spaced outlets toward the rearward end of the duct. The inlet is connected to the outlet of a heating, ventilation and air conditioning (HVAC) case. The outlets are connected to registers through which air is discharged into the vehicle. The registers are adjustable to allow passengers to control airflow from the duct. A second duct may extend parallel to and toward an upper end of the air supply duct. This duct functions as a demister to supply air to the windshield and the windows of the passenger compartment doors. The air may be supplied through upper and lateral ends of the demister duct to eliminate mist on the windshield and windows of the passenger compartment doors.

Conventional cross car beams, E/A brackets and steering column support brackets are made of steel. However, steel is an expensive material that is costly to form into anything but simple shapes. Moreover, it is relatively heavy. On the other hand, the ducts have conventionally been made of plastic, which is generally cheaper than steel and less costly to form complex shapes. However, plastics have traditionally lacked the structural integrity of steel and so have not been used for structural support in this area of the vehicle.

One proposed cross car member is formed of plastic parts connected to define vehicle air flow passages. The cross-sectional shape of the air flow passages through the cross beam change along the length of the cross-beam. Thus, the cross beam likely would not provide sufficient (structural support against lateral impacts, as does the conventional steel beam. Also, the duct is not formed to support fore-aft and vertical loads needed for mounting vehicle components to the duct. Additionally, when forming these assemblies, one needs to assure that they do not create undesirable noise (squeak and rattle) for the vehicle occupants.

Therefore, it is desirable to have a plastic cross car beam and duct assembly that can support lateral loads from a vehicle impact, as well as fore-aft and vertical loads from mounting components, that is formable into complex shapes to minimize the number of parts in an assembly and ease installation, while maintaining good air flow from a HVAC system, and also is formed to minimize any concerns with squeak and rattle being caused by the assembly.

SUMMARY OF THE INVENTION

The present invention is directed toward a cross car beam for a motor vehicle. The cross car beam comprises a first member and a second member being formed of a plastic material and joined together forming sealing areas to define a first and a second air passage, with the first air passage adapted to be secured to and extend between vehicle sides, and with the first air passage having an essentially constant cross sectional shape along the majority of the length of the cross beam; and a support extending from one of the members and being integral with the member from which the support extends, with the support having a first portion being adapted to receive and support an HVAC case, and at least one of the first and second members includes an inlet adapted to align with an outlet in the HVAC case, and with the support including at least one pocket for receiving an energy absorbing bracket.

In a preferred embodiment of this invention, the cross beam extends between the door pillars of a vehicle. The cross beam is preferably formed of two molded parts having outer sealing edges and an intermediate sealing edge. The cross beam members are bonded together to provide at least two air flow passages.

A preferred cross sectional shape for each of the air flow passages is also disclosed.

Various objects and advantages of this invention will become apparent to those skilled in the art from the following detained description of the preferred embodiment, when read in light of the accompanying drawings.

DETAILED DESCRIPTION OF THE PREFERRED EMBODIMENTS

Figure 1:
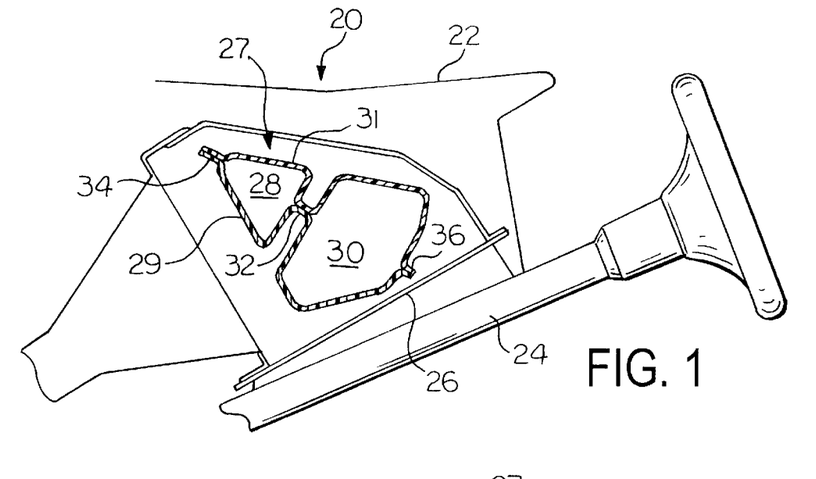
FIG. 1 is a cross sectional view through a vehicle interior incorporating the present invention.

In a first embodiment of the invention, FIG. 1 shows a vehicle interior 20 having an instrument panel 22 and a steering column 24. A housing 26 is mounted to a cross beam 27 defining a pair of hollow members, which are air flow passages 28 and 30, between two molded plastic parts 29 and 31. As shown, the two molded plastic parts 29 and 31 contact each other at sealing areas 32, 34 and 36 to define and seal the air flow passages 28 and 30. The parts 29 and 31 are preferably bonded together by vibration welding to assure a strong joint without creating squeak and rattle problems between the two parts 29, 31.

Figure 2:
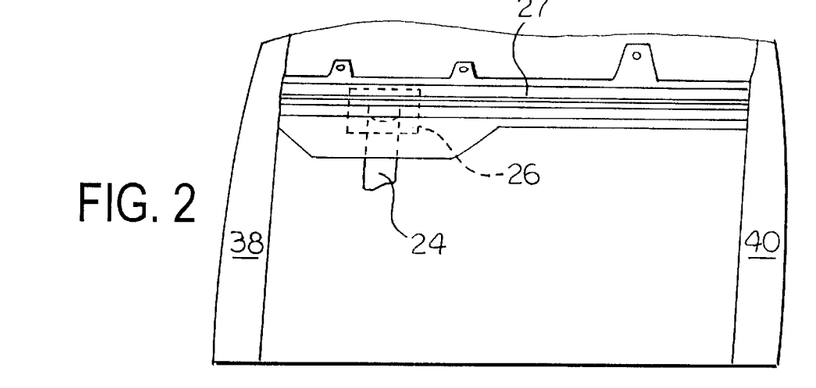
FIG. 2 is a front view of a schematic representation of the vehicle interior of FIG. 1.

As shown in FIG. 2, the cross beam 27 is secured and extends between the vehicle door pillars 38 and 40. As known, vehicle door pillars are positioned forwardly of the vehicle doors in a vehicle cabin. The cross bean 27 extends between the door pillars and is shaped to provide rigidity against a lateral impact to the vehicle. Preferably, cross beam 27 is formed of a molded plastic having sufficient strength, such as engineering plastics.

Figure 3:
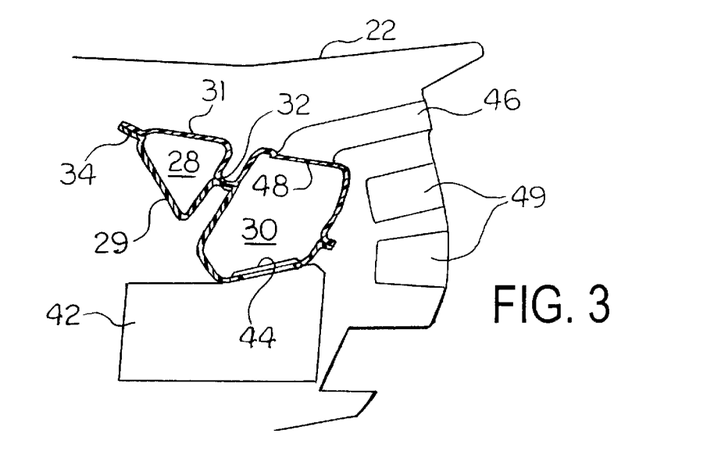
FIG. 3 is a cross section along a plane parallel to the FIG. 1 view.

FIG. 3 shows a view similar to FIG. 1, but further into the plane of the paper from the FIG. 1 plane. As shown, the cross-sectional shape of the air flow passages 28 and 30 is relatively constant from the FIG. 1 view. However, in the particular plane illustrated in FIG. 3, a heating, ventilation and air conditioning (HVAC) system 42 is attached into an opening 44 in the part 29. Thus, the system 42 can supply air to the vents between the passages 30 or 28. Further, an outlet 46 extends through the instrument panel 22 for delivering air through an opening 48 in the member 31. Other accessories 49 are mounted adjacent to the cross beam 27.

The cross-sectional shape of the passages 28 and 30 is chosen to be essentially constant along the entire length of the cross beam 27. There is some variation in the vicinity of the opening such as opening 44 and 48. However, over the majority of the length the cross-sectional shape is constant to maximize rigidity.

Figure 4:
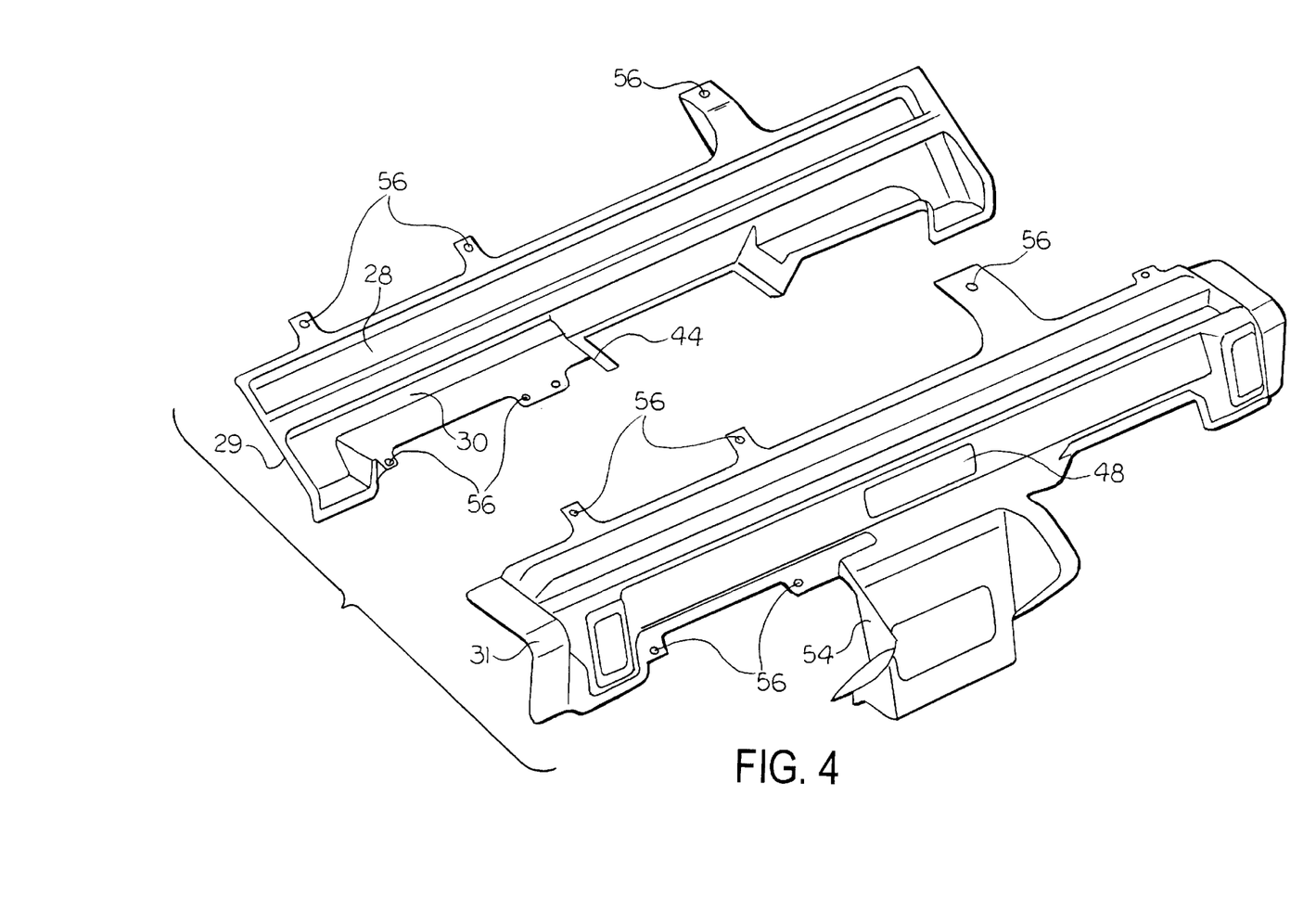
FIG. 4 is an exploded view of the inventive cross beam member.

FIG. 4 shows an exploded view of the two parts 29 and 31. As can be appreciated, the air flow passages 28 and 30 extend for the great bulk of the length of the cross beam parts 29 and 31, providing an essentially constant cross-sectional shape. The bolt areas 56 secure the combined parts 29 and 31 to other structures in the vehicle, i.e., housing 26, etc.

A mounting area 54 is mounted adjacent one of the cross beam parts and serves to provide a mount location for another structural member.

Figure 5:
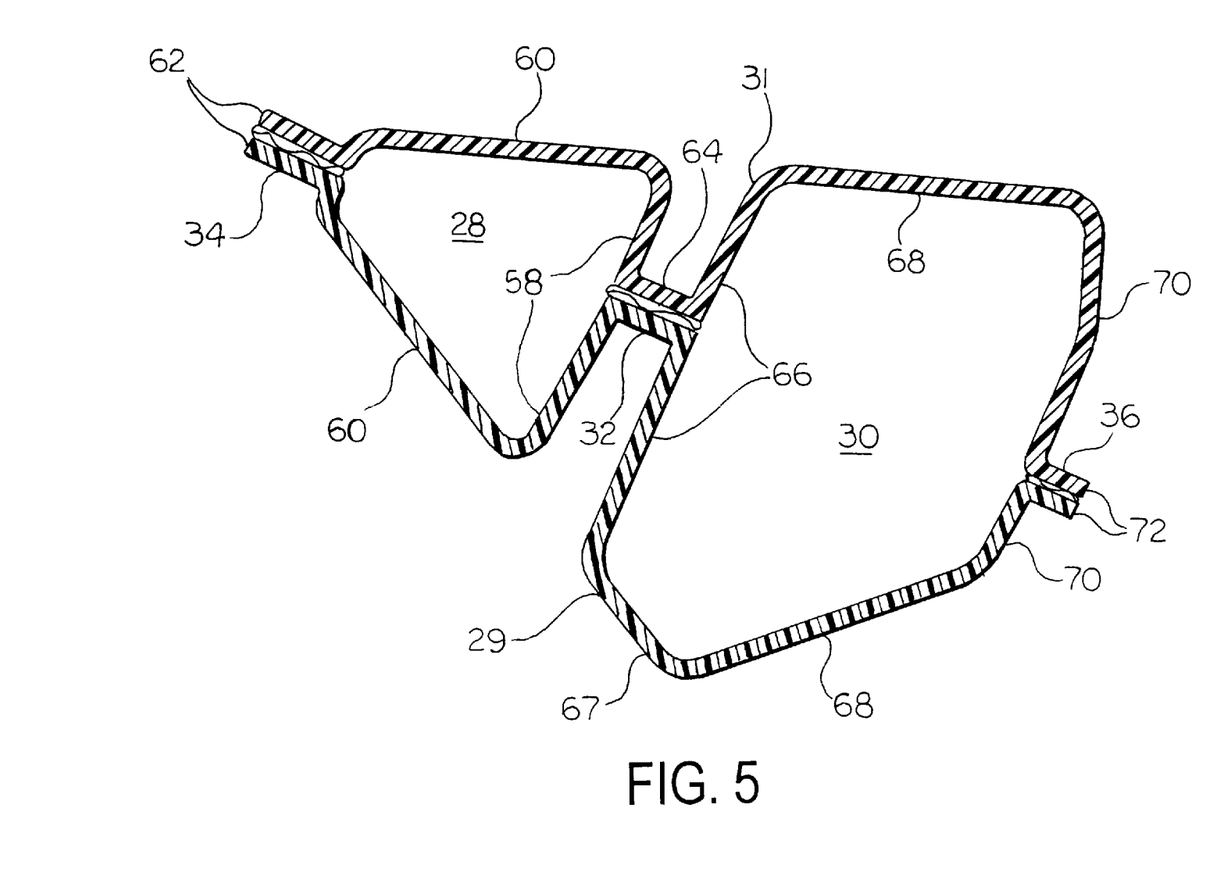
FIG. 5 is a cross sectional view through the assembled view cross beam member.

FIG. 5 shows a preferred cross-sectional shape for the passages 28 and 30. As shown, the parts 29 and 31 define passage 28 which is essentially triangular, and formed of portions 58 extending outwardly of a sealing portion 64 to an inwardly extending outer portion 60. Inwardly extending outer portion 60 extends to a sealing outer portion 62. The other end of portion 64 extends to an outwardly extending portion 66 which extends through a portion 68 on an upper side, and to another portion 70 which extends to sealing portion 72. Portion 66 on the part 29 extends to a portion 67 which extends to portion 68, which is in turn extending into the portion 70 and sealing portion 72. The particular cross-sectional shape has structural benefits and good flow characteristics. Namely, that both sections are shaped to allow for large openings for air flow, while having shapes well suited for supporting fore-aft and vertical loadings. However, it should be understood that other cross-sections can be utilized.

Figure 6:
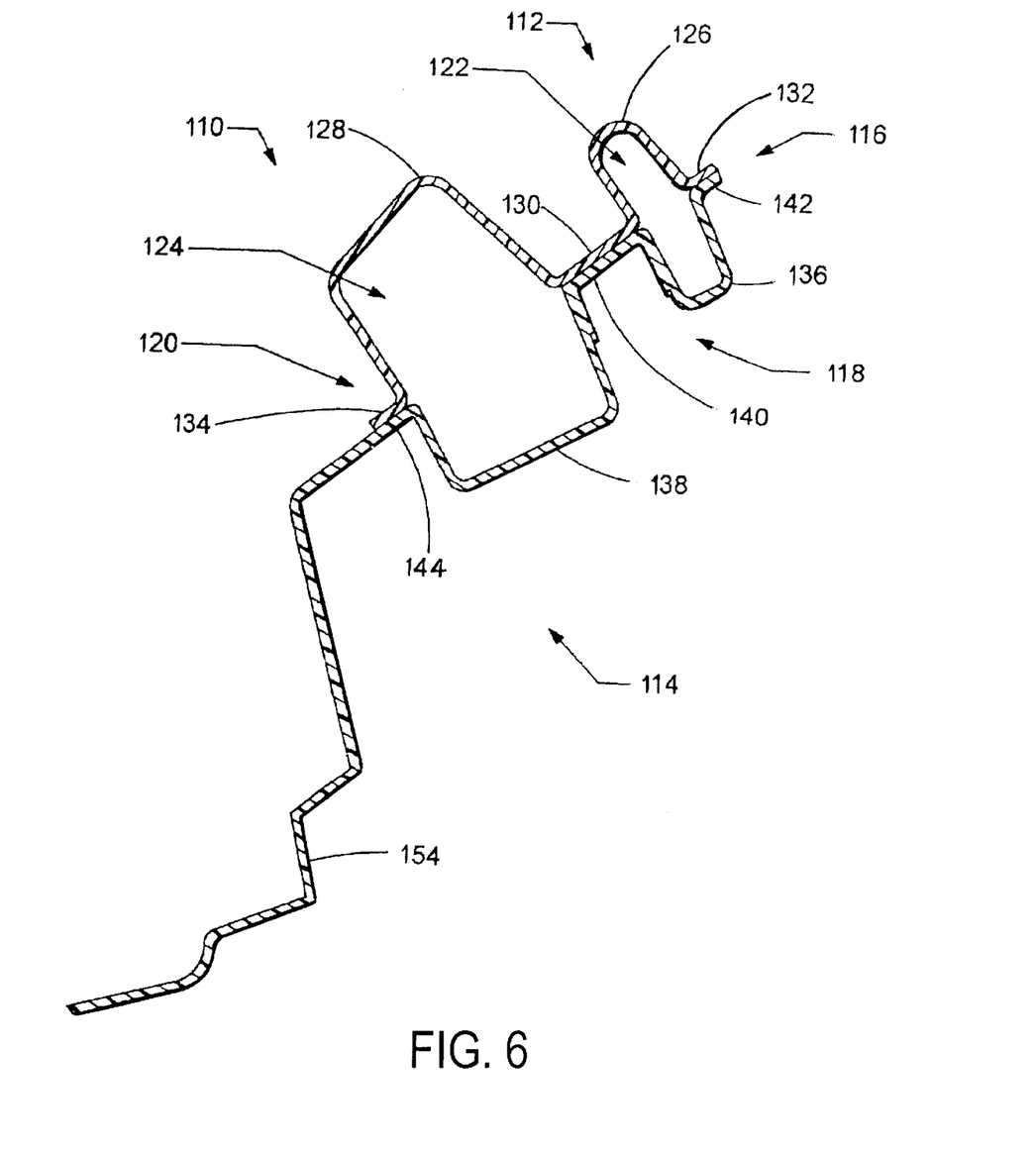
FIG. 6 is a sectional view in elevation of a cross car beam according to a second embodiment of the present invention.

A second embodiment of the present invention is illustrated in FIGS. 6–14. There is shown in FIG. 6 a sectional view of a cross car beam 110 for a motor vehicle. The cross car beam 110 is formed from two members 112, 114 joined together at sealing points 116, 118, 120.

The two members 112, 114 are sealed to form two chambers 122, 124. A first member 112 preferably comprises two separate laterally extending semi-cylindrical portions 126, 128. A laterally extending central or inner flange 130 is disposed between the semi-cylindrical portions 126, 128. The inner flange 130 is preferably formed integrally with the semi-cylindrical portions 126, 128 to join opposing inner edges of the semi-cylindrical portions 126, 128 together. Each semi-cylindrical portion 126, 128 has a free outer edge opposite its inner edge. Each outer edge supports a laterally extending outer flange 132, 134.

Similar to the first member 112, a second member 114 preferably comprises two separate laterally extending semi-cylindrical portions 136, 138. A laterally extending central or inner flange 140 is likewise disposed between these semi-cylindrical portions 136, 138. The inner flange 140 is preferably formed integrally with the semi-cylindrical portions 136, 138 to join opposing inner edges of the semi-cylindrical portions 136, 138 together. Like the first member 112 above, each semi-cylindrical portion 136, 138 of the second member 114 has a free outer edge opposite its inner edge. Each outer edge supports a laterally extending outer flange 142, 144.

The flanges form the sealing points 116, 118, 120 between the two members 112, 114. The flanges 130, 132, 134 of the first member 112 are arranged to align with the flanges 140, 142, 144 of the second member 114. The aligned flanges are preferably substantially planar and parallel to one another. The flanges are preferably sufficiently large enough to make good surface contact with one another.

The aligned flanges are joined together to form the two chambers 122, 124. The flanges may be joined together in any suitable fashion. In a preferred embodiment of the invention, the flanges are joined together by vibration welding. Upon welding the flanges together, a seal is produced. Also, since they are welded rather than bolted together, this substantially reduces the risk of creating squeak and rattle problems between these parts.

Figure 7:
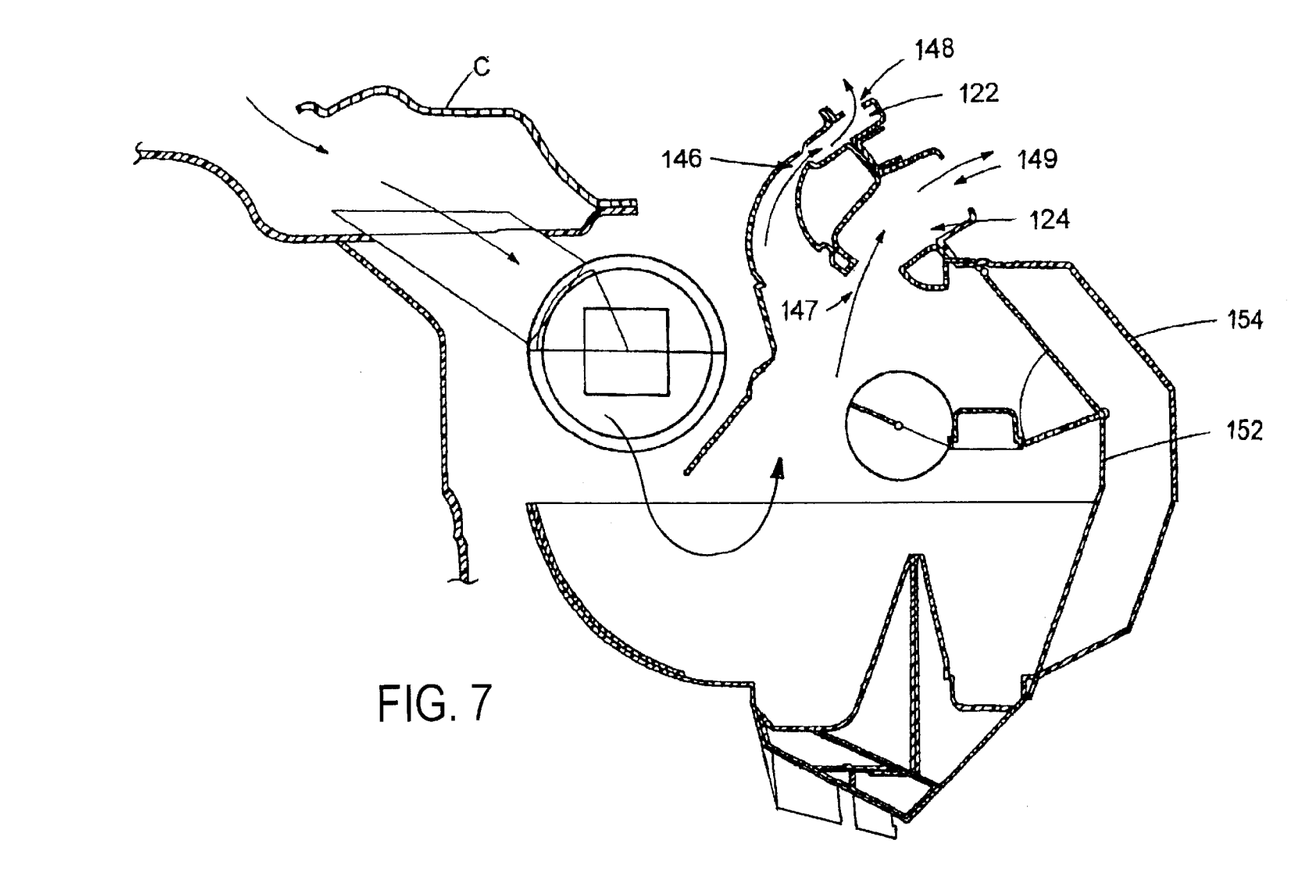
FIG. 7 is a reduced scale sectional view in elevation of the cross car beam shown in FIG. 6 supporting the HVAC case.

As shown in FIG. 7, each chamber 122, 124 is provided with at least one inlet 146, 147 and one or more outlets 148, 149. It is preferred that the chambers 122, 124 have a plurality of laterally spaced outlets. In addition, it is preferred that the lateral ends of one of the chambers 122 have outlets (not shown). The inlets 146, 147 are adapted to align with the outlet of a HVAC case 152. The outlets 148, 149 are adapted to be connected to vents or registers (not shown). One of the chambers 124 functions to supply air through the registers to the passenger compartment. The other chamber 122 functions as a demister to supply air through the vents or registers to the windshield and the windows of the passenger compartment doors. Air supplied to the passenger compartment may be heated or cooled as desired by the motor vehicle passengers. Air supplied to the windshield or windows facilitates in defrosting or demisting the windshield and windows. Air passing through the chambers 122, 124 may be controlled by passengers by controlling the HVAC case 152 via environmental controls (not shown). The quantity and direction of air passing through the registers may be controlled by the passengers by adjusting the registers.

A support member 154 preferably extends downward from one of the chambers 124. The support member 154 is preferably an integral part of one of the two members 112, 114 forming the cross car beam 110. The support member 154 functions to support the HVAC case 152 as well as other components, such as a passenger airbag, a glove compartment, an ash tray, a cigarette lighter or a power outlet, a radio storage pocket, and a coin receptacle, to name a few. This list is not an all inclusive list of components that may be supported by the support member 154 but rather is an illustrative list.

Figure 8:
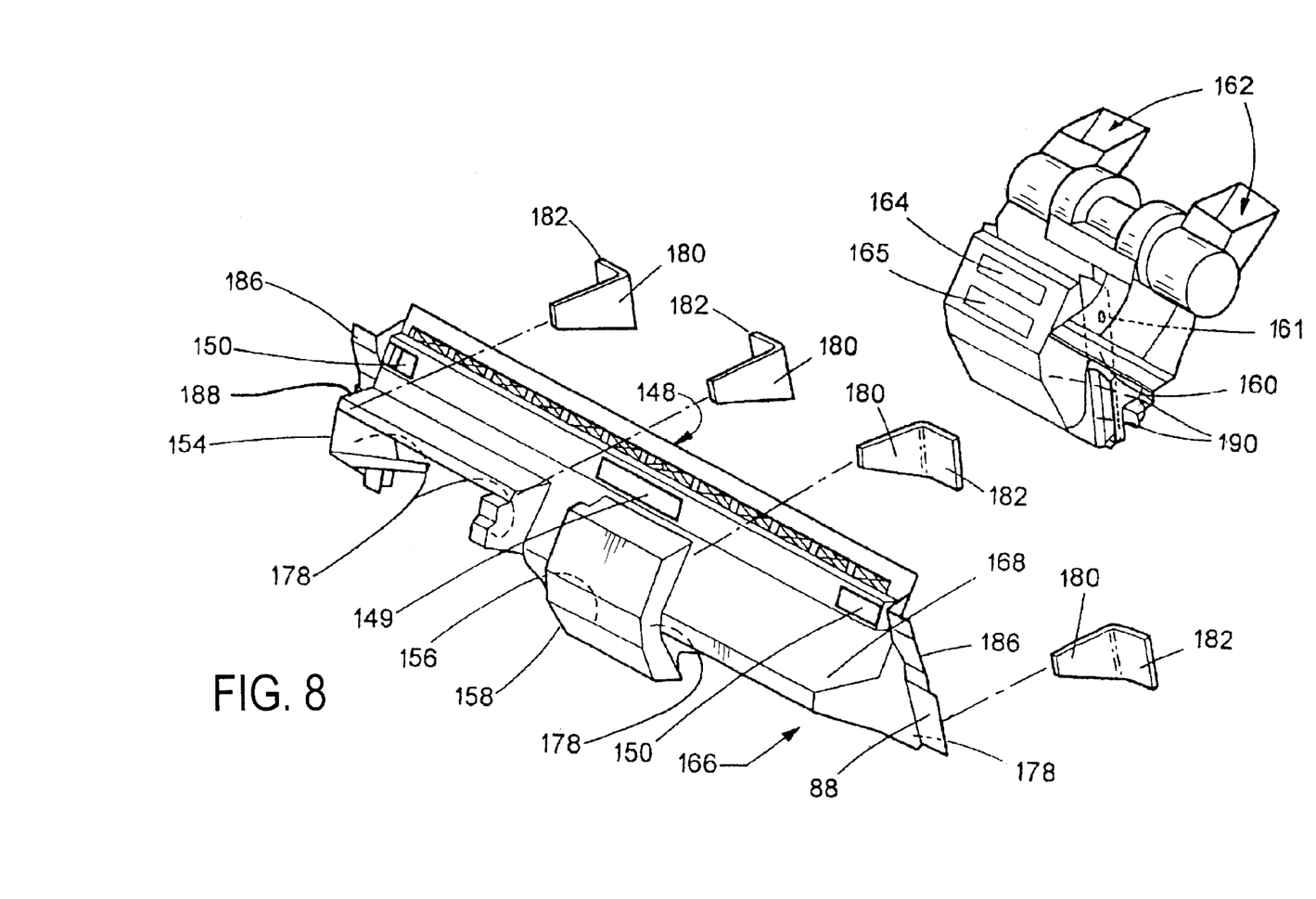
FIG. 8 is an exploded, reduced scale rear perspective view of a second member of the cross car beam and the HVAC case shown in FIG. 7.

As is shown in FIG. 8, the support member 154 may include a recess 156 for receiving the HVAC case 152. The recess 156 is preferably centrally located between lateral ends of the support member 154. The recess 156 may be defined by an enclosure 158 that projects rearward from the support member 154. The enclosure 158 has a forward exposed opening for receiving the HVAC case 152.

The HVAC case 152 is provided with laterally opposed flanges 160. The flanges 160 are provided with aperture 161 that are adapted to align with apertures (not shown) in the support member 154. The aligned apertures are adapted to receive fasteners (not shown) for securing the HVAC case 152 to the support member 154.

Any suitable HVAC case 152 may be received by the HVAC case enclosure 158. It is preferred that the HVAC case 152 be provided with two laterally spaced inlets 162. A centrally disposed blower motor may drive laterally opposed dual cage fans that draw air from outside of, or within, the motor vehicle. The air may be passed through the HVAC case 152 to heat or cool the air. The air is discharged from the HVAC case outlets 164, 165 into the chamber inlets 146, 147 (shown in FIG. 7). The air passes through the chambers 122, 124 and is discharged through the chamber outlets 148, 149, 150 and further through the vents or registers as desired by the passengers. Certainly, the HVAC case 152 may be provided with an outlet for discharging air into the passenger compartment without passing the air through the chambers 122, 124 such as by discharging air near passengers' feet.

An opening 166 may be formed in the support member 154 to one side of the HVAC case enclosure 158. The opening 166 may be shaped and dimensioned to receive a glove compartment (not shown). The glove compartment is preferably insertable into the opening 166 so that it extends forward of the support member 154. The support member 154 is sufficiently structured to support a glove compartment door (not shown) adjacent the glove compartment. The glove compartment door may be fastened to the support member 154 in any suitable fashion.

Figure 9:
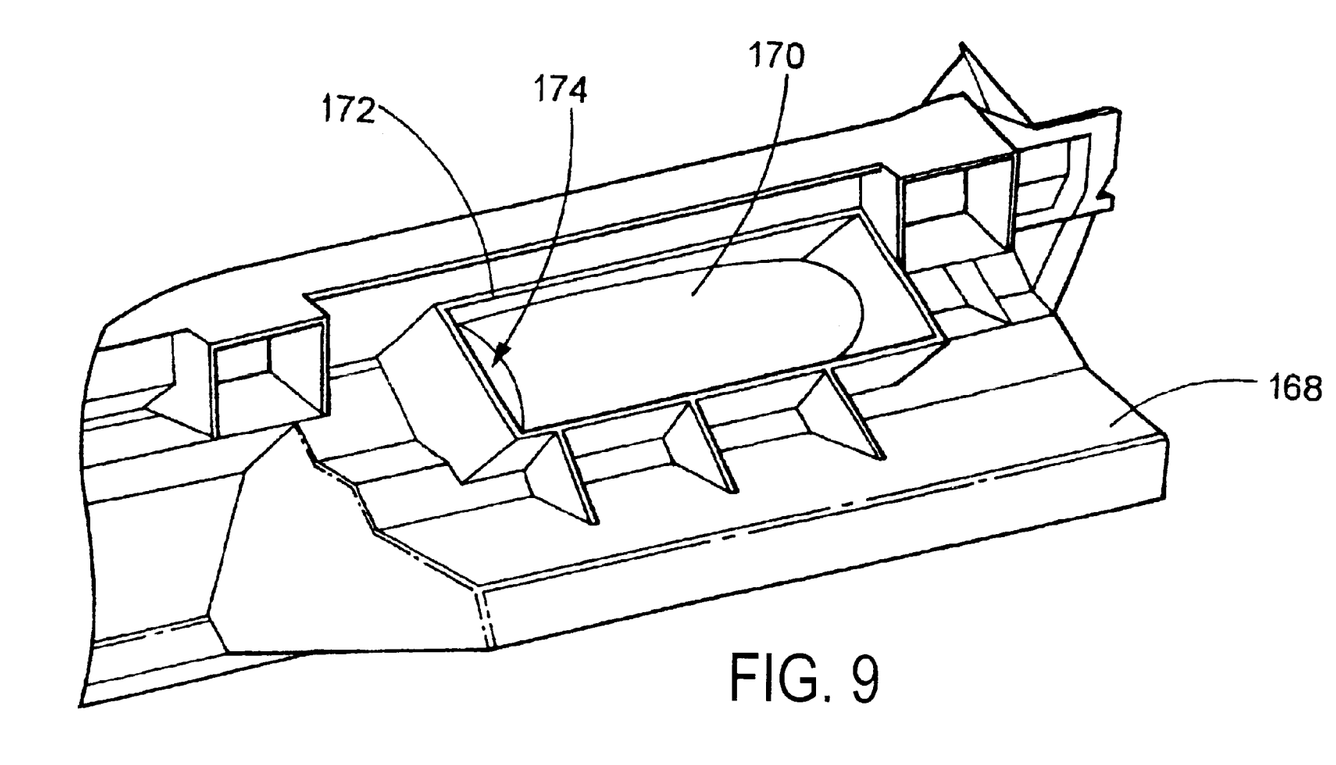
FIG. 9 is an enlarged, partial rear perspective view of the second member shown in FIG. 8 with an enclosure for receiving an airbag canister.
Figure 10:
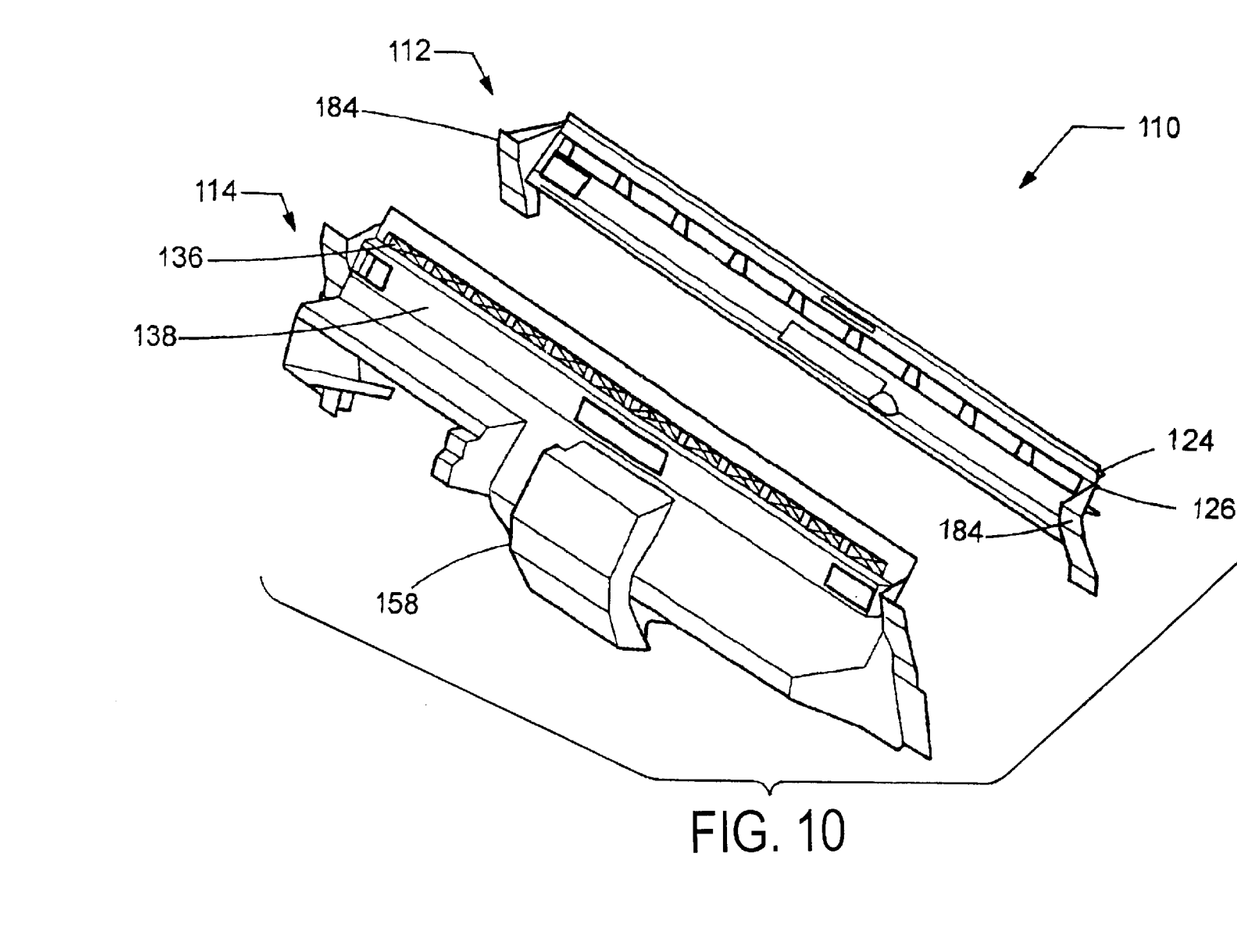
FIG. 10 is an exploded, reduced-scale, rear perspective view of a cross car beam shown in FIG. 6.
Figure 11:
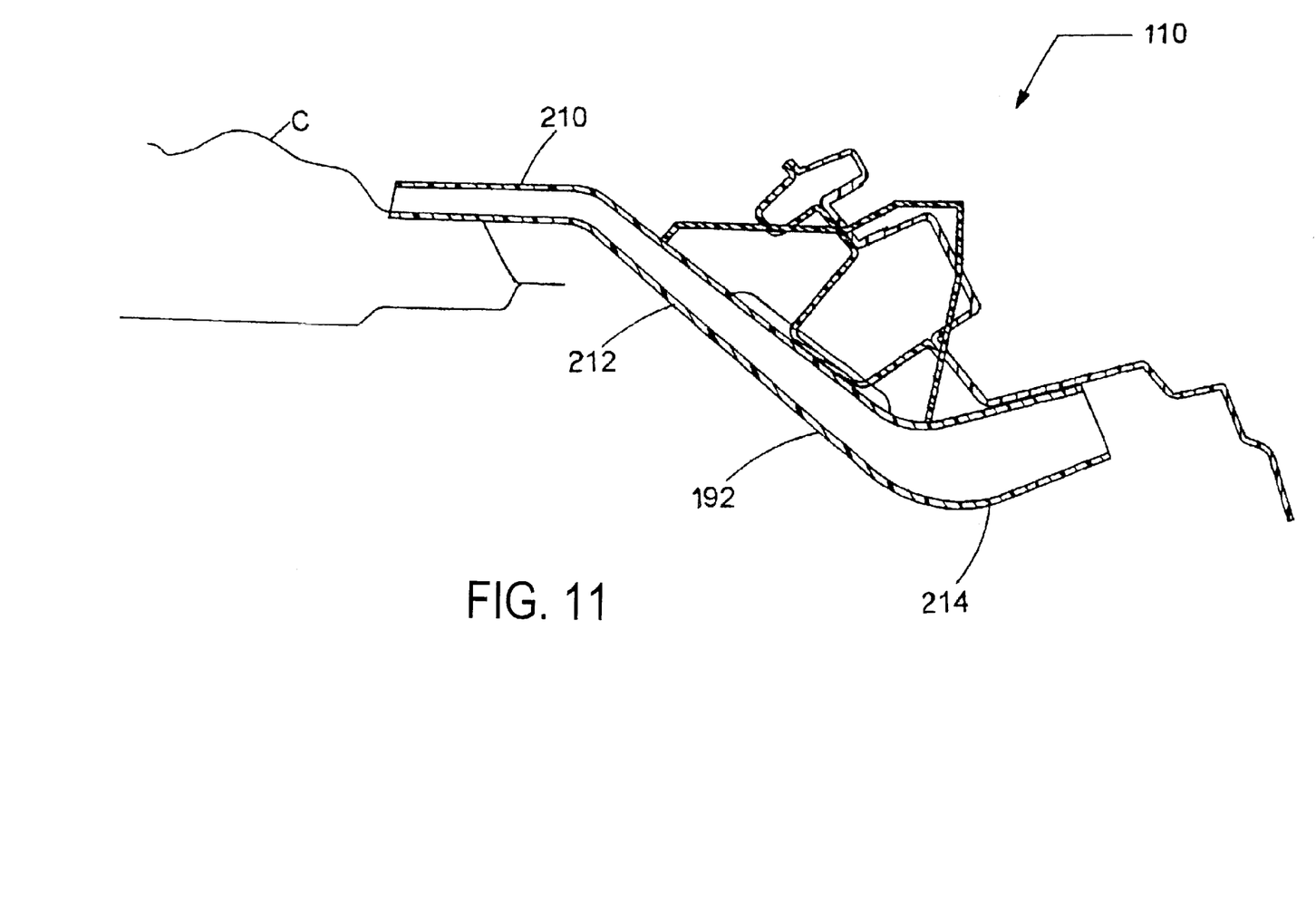
FIG. 11 is a diagramatic representation in elevation of the HVAC case shown in FIGS. 7 and 8 secured to the tunnel of a motor vehicle.
Figure 12:
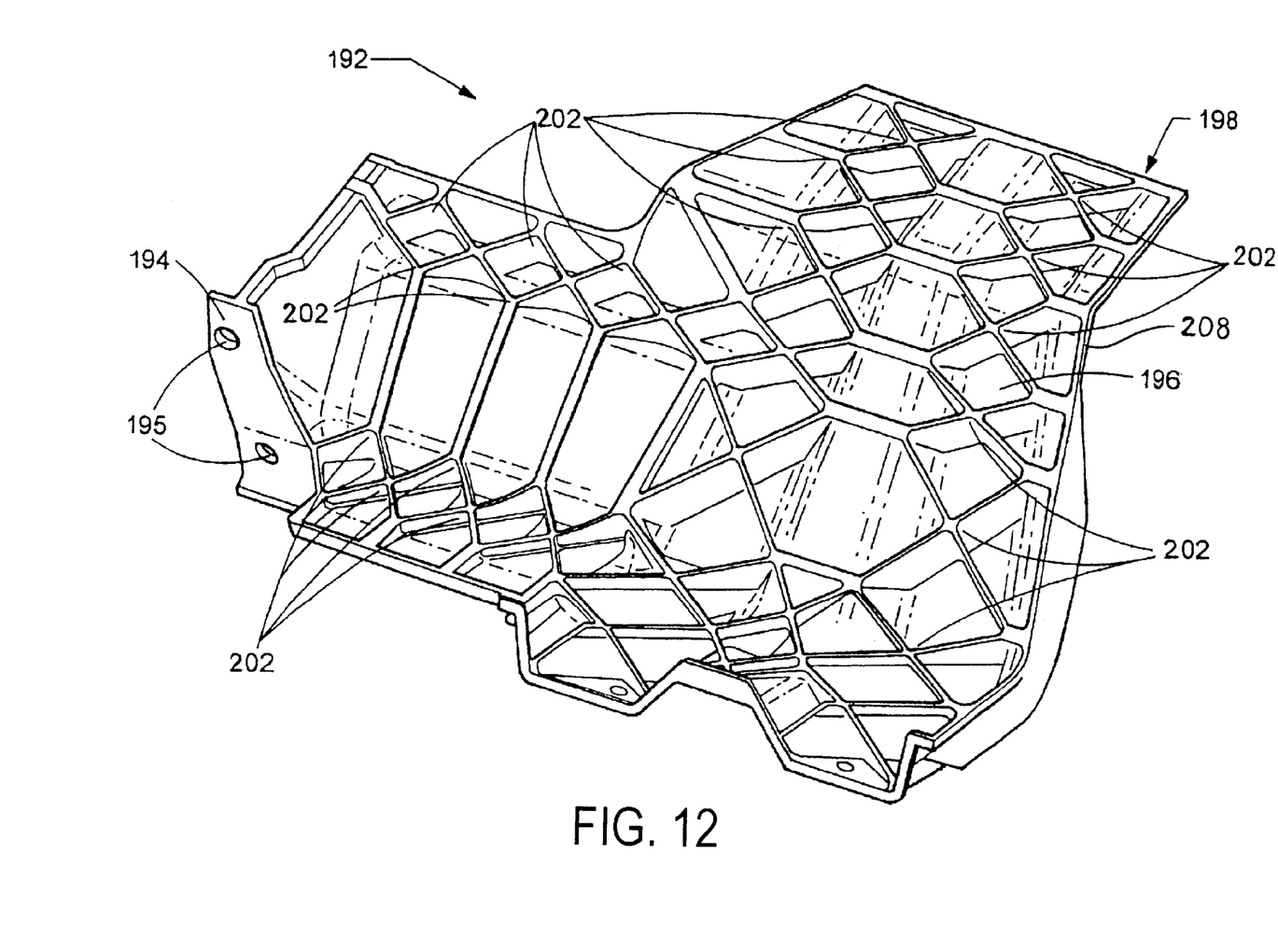
FIG. 12 is a reduced-scale sectional view in elevation of the cross car beam shown in FIG. 6 and a steering column support bracket connected between the motor vehicle plenum chamber and the cross car beam.
Figure 13:
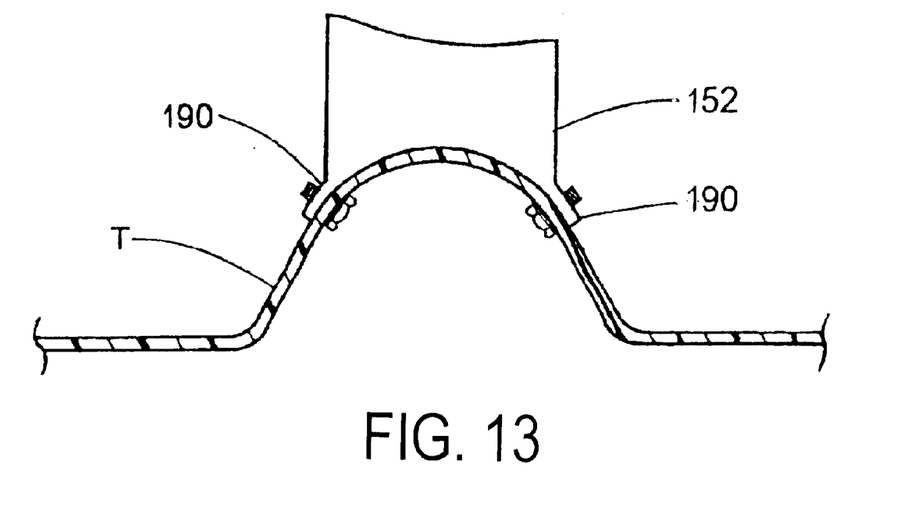
FIG. 13 is an enlarged top perspective view of the steering column support bracket shown in FIG. 12, as viewed from the rear.

The support member 154 may form a support surface or shelf 168 above the glove compartment opening 166. The shelf 168 may be adapted to support an airbag canister 170 (as can be seen in FIG. 9). In the preferred embodiment of the invention, the support member 154 forms an enclosure 172. This enclosure 172 defines a recess 174 for supporting the airbag canister 170. The enclosure 172 may be covered with a releasable panel (not shown) that encloses the airbag canister 170 in the enclosure 172. The panel may be released upon inflation of the airbag (not shown), which occurs in the event that the motor vehicle sustains an impact.

The support member 154 is preferably structured to provide support for vehicle components, such as the ash tray, cigarette lighter or power outlet, radio (none of which are shown), in a place within reach of a motor vehicle operator or passenger. A suitable location would be proximate the center of the support member 154, that is, between the lateral ends of the support member 154. Such components may be supported rearward of the HVAC case enclosure 158.

The support member 154 may form pockets or receptacles, or may define openings for receiving pockets or receptacles, in various locations. For example, an opening may be formed proximate the center of the support member 154 between the lateral ends for receiving an ashtray. A pocket may be formed or inserted in the same proximate location for storing sundry items. An opening may be provided in the same proximate location for supporting a cigarette lighter or power outlet. Of course, the motor vehicle would be provided with an interior panel, commonly referred to as a dash panel, which may be suitable for supporting various components exclusive of the support member 154.

In addition to the foregoing, the support member 154 may be provided with pockets 178 for receiving E/A brackets 180. The pockets 178 are preferably provided with forward exposed openings through which the E/A brackets 180 may be inserted. Pockets 178 are preferably formed toward the lateral ends of the support member 154 and adjacent opposing lateral ends of the HVAC case enclosure 158, thus providing four pockets 178 for supporting four separate E/A brackets 180. The support member 154 may be provided with apertures (not shown) that align with apertures in respective E/A brackets 180. The apertures are provided for receiving fasteners for securing the E/A brackets 180 within their respective pockets 178.

The E/A brackets 180 toward the lateral ends of the support member 154 each preferably includes one or more flanges 182 that extend laterally outward. The lateral ends of the first and second members 112, 114 of the cross car beam 110 also include flanges 184 (shown in FIG. 10), 186, 188 that extend laterally outward. The E/A bracket flanges 182, 184 align with the respective cross car member flanges 186, 188 of the first and second members 112, 114 of the cross car beam 110. The flanges 182, 184, 186, 188 are provided for securing the first and second members 112, 114 of the cross car beam 110 and the E/A brackets 180 to the opposing cowl sides of the motor vehicle. Apertures (not shown) may be provided in the flanges 182, 184, 186, 188 and in the cowl side for receiving fasteners (also not shown) for securing the cross car beam 110 and the E/A brackets 180 to the opposing cowl sides.

One of the central E/A brackets 180 is secured to the HVAC case 152 toward the passenger side of the passenger compartment. The other central E/A bracket 180 is secured to a brake pedal support bracket (not shown) located on the driver's side of the passenger compartment. This secures all four E/A brackets 180 in a substantially fixed position.

It should be noted that the flanges 182, 184, 186, 188 may support the cross car beam 110 in a desired orientation. For example, it may be desirable for the cross car beam 110 to be disposed at a particular angle, that is, to orient the demister chamber 122 forward relative to the air supply chamber 124, as shown.

To assist in supporting the cross car beam 110, the HVAC case 152, which is secured to the support member 154, may in turn be secured in a substantially fixed position relative to the motor vehicle. For example, motor vehicles are provided with a floor pan. A raised portion of the floor pan defines a tunnel for receiving the motor vehicle transmission and through which passes the motor vehicle drive shaft. Brackets 190 may be provided toward opposing lateral ends of the HVAC case 152. The brackets 190 may be provided with apertures (not shown) which align with apertures in the tunnel. The aligned apertures are adapted to receive fasteners for securing the HVAC case 152 to the tunnel T (shown in FIG. 13).

The cross car beam 110 is adapted to be used in combination with a steering column support bracket 192. In addition to the support provided by the flanges 182, 184, 186, 188 and the HVAC case 152, the cross car beam 110 may be secured in a substantially fixed position relative to the plenum chamber or cowl top C (shown in FIG. 11) by the steering column support bracket 192. The steering column support bracket 192 is preferably located toward the driver's side of the passenger compartment, that is, between the HVAC case enclosure 158 and the cowl side on the driver's side of the passenger compartment. A lateral end of the steering column support bracket 192 may also be provided with a flange 194. This flange 194 may align with a respective cross car beam member flange 186, 188 and a respective E/A bracket flange 182. The steering column support bracket 192 may be provided with apertures 195 (shown in FIG. 12) that are adapted to align with the apertures in the cross car beam member flanges 186, 188 and the E/A bracket flange 182. The apertures are adapted to receive fasteners (not shown) for securing the aligned flanges 194, 186, 188, 182 to a respective cowl side of the motor vehicle.

According to a preferred embodiment of the invention, the steering column support bracket 192 is formed from metal 196, such as a steel stamping, with resin or plastic 198 molded over or encapsulating the metal 196. The plastic 198 encapsulating the metal 196 is webbed or ribbed. The plastic ribs 200 intersect one another to form intersections 202. The metal 196 is preferably provided with a depression or protrusion 204 at each intersection 202. Each protrusion 204 (shown in FIG. 14) is preferably provided with a hole 206. When encapsulating the metal 196, the plastic 198 passes through the hole 206. When the plastic 198 cools, it is retained in the hole 206, holding the plastic 198 tightly in contact with the metal 196. In a preferred embodiment of the invention, only one side of the metal 196 is encapsulated with plastic 198. However, both sides of the metal 196 may be encapsulated with plastic 198, thus encapsulating the entire metal 196.

Figure 14:
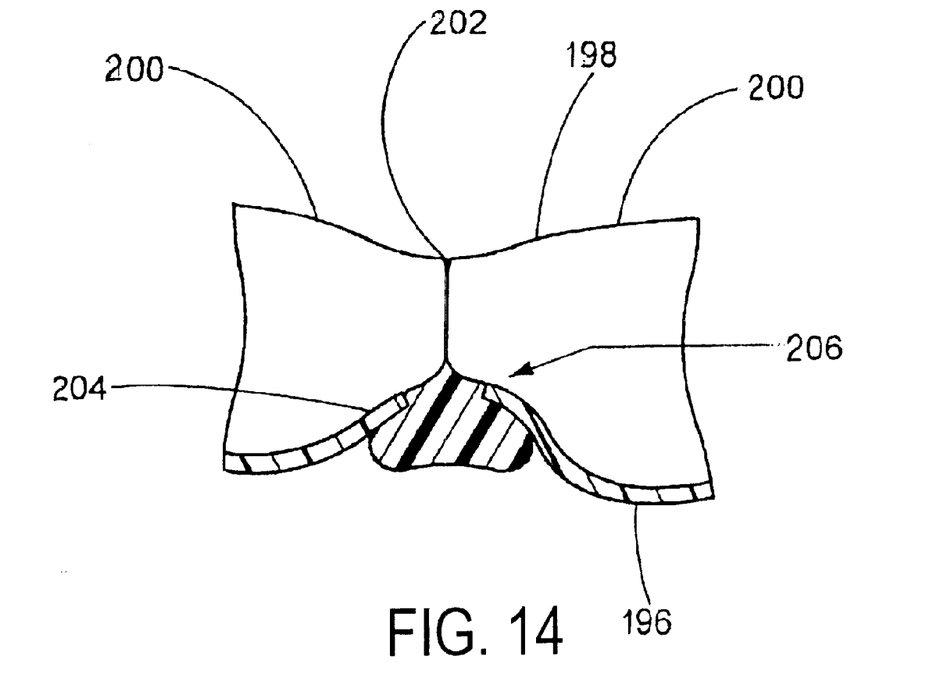
FIG. 14 is a diagramatic representation of a section of the steering column support bracket shown in FIGS. 12 and 13 further showing a protrusion with a hole therein at the intersection of plastic ribs with plastic passing through and retained in the hole.

When only one side of the metal 196 is encapsulated, the plastic preferably wraps about the peripheral edges of the metal 196, as indicated at 208. This further insures that the plastic ribs 200 maintain contact with the metal 196. The retention of the plastic 198 in the holes 206 in the protrusions 204 and the plastic wrapped about the peripheral edges of the metal 196 holds the plastic ribs 200 in a substantially fixed position relative to the metal 196.

The metal 196 preferably has a z-shaped construction defined by an upper forward leg 210, a central diagonally extending leg 212, and a lower rearward leg 214. The upper forward leg 210 is provided with apertures that are adapted to align with apertures in the cowl top. The aligned apertures are adapted to receive fasteners (also not shown) for fastening the steering column support bracket 192 to the cowl top. The central diagonally extending leg 212 is likewise provided with apertures. These apertures are adapted to align with apertures (not shown) in the support member 154 between the HVAC case enclosure 158 and the E/A bracket 180 on the driver's side of the passenger compartment. These apertures are adapted to receive fasteners (also not shown) for fastening the steering column support bracket 192 to the support member 154. The lower rearward leg 214 is also provided with apertures. These apertures are adapted to align with apertures (not shown) in a lower end of the support member 154 and in a U-shaped steering column clamp. These apertures are adapted to receive fasteners (not shown) for fastening the U-shaped clamp, the steering column support bracket 192, and the support member 154 together.

It may be desirable to provide bosses (not shown) on the support member 154, the HVAC case 152, the steering column support bracket 192, or other components where components are secured together. This may insure that components are tightly secured in a fixed position relative to one another.

It is preferred that that members 112, 114 of the cross car beam 110 be formed from injection molded plastic. It should be understood that more than two ducts may be formed. The various inlets and outlets may be provided in locations other than those locations shown. The members 112, 114 of the cross car beam 110 may be provided with ribs to improve the structural integrity of the cross car beam 110. Likewise, the steering column support bracket ribs 200 may be strategically located to increase its structural integrity, and thus, achieve optimal load distribution. It is most preferred that the plastic used be a high performance styrenic, such as glass filled engineering resin. Glass filled DYLARK, by Nova Chemicals Corporation, in Calgary, Alberta, Canada, is a suitable plastic for use in carrying out the invention.

While preferred embodiments of the present invention have been disclosed. It should be understood that modifications of these embodiments would come within the scope of this invention. For that reason, the following claims should be studied to determine the true scope and content of this invention.

What is claimed is:

1. A cross beam for a vehicle comprising:

a first member and a second member being formed of a plastic material and joined together forming sealing areas to define a first and a second air passage, with the first air passage adapted to be secured to and extend between vehicle sides, and with the first air passage having an essentially constant cross sectional shape along the majority of the length of the cross beam; and a support extending from one of the members and being integral with the member from which the support extends, with the support having a first portion being adapted to receive and support an HVAC case, and at least one of the first and second members includes an inlet adapted to align with an outlet in the HVAC case, and with the support including at least one packet for receiving an energy absorbing bracket.

2. The cross beam of claim 1 wherein the second air passage is adapted to extend between the vehicle sides and has a generally polygonal shape with more than three sides that is essentially constant along the majority of the length of the cross beam.

3. The cross beam of claim 1 wherein the sealing areas are formed by vibration welding.

4. The cross beam of claim 1 wherein the support includes a second portion adapted for receiving and supporting a glove compartment.

5. The cross beam of claim 4 wherein the support includes a third portion adapted for receiving and supporting an airbag canister.

6. The cross beam of claim 5 wherein at least one of the first and second members includes a plurality of pockets, each adapted for receiving an energy absorbing bracket.

7. The cross beam of claim 1 wherein the first portion of the support is adapted to receive and support a glove compartment.

8. The cross beam of claim 1 wherein the first portion of the support is adapted to receive and support an air bag canister.

9. The cross beam of claim 1 wherein the sealing areas formed by the first and second members include two outer sealing areas, and an intermediate sealing area located between the first and the second air passages.

10. The cross beam of claim 1 wherein the first portion of the support is adapted to receive a steering column support bracket.

11. A cross beam for a vehicle comprising:

a first member and a second member being formed of a plastic material and joined together forming sealing areas to define a first and a second air passage, with the first air passage adapted to be secured to and extend between vehicle sides, and with the first air passage having an essentially constant cross sectional shape along the majority of the length of the cross beam; and a support extending from one of the members and being integral with the member from which the support extends, with the support having a first portion including a plurality of pockets each adapted for receiving an energy absorbing bracket, and a second portion adapted to receive an HVAC case.

12. The cross beam of claim 11 wherein the sealing areas are formed by vibration welding.

13. The cross beam of claim 11 wherein the second air passage is adapted to extend between the vehicle sides and has a generally polygonal shape with more than three sides that is essentially constant along the majority of the length of the cross beam.

14. A cross beam for a vehicle comprising:

a first member and a second member being formed of a plastic material and joined together forming sealing areas to define a first and a second air passage, with the first air passage adapted to be secured to and extend between vehicle sides, and with the first air passage having an essentially constant cross sectional shape along the majority of the length of the cross beam; and a support extending from one of the members and being integral with the member from which the support extends, with the support having a first portion being adapted to receive and support a vehicle interior component and at least one pocket for receiving an energy absorbing bracket.

* * * * *

UNITED STATES PATENT AND TRADEMARK OFFICE
CERTIFICATE OF CORRECTION

PATENT NO.     : 6,582,011 B2                                                                 Page 1 of 1
DATED          : June 24, 2003
INVENTOR(S)    : Jack S. Palazzolo et al.

It is certified that error appears in the above-identified patent and that said Letters Patent is hereby corrected as shown below:

<u>Title page,</u>
Item [63], Related U.S. Application Data, delete the existing paragraph and substitute the following paragraph:
-- [63] Continuation-in-part of application No. 09/608,569, filed on Jun. 30, 2000, which is a continuation-in-part of application No. 09/265,745, filed on Mar. 9, 1999. --

Signed and Sealed this

Twenty-third Day of September, 2003

JAMES E. ROGAN
*Director of the United States Patent and Trademark Office*